April 5, 1932. J. G. MOYEN ET AL 1,852,468
THERMOSTATIC SWITCH
Filed Feb. 4, 1930    2 Sheets-Sheet 1

INVENTORS:
JOHN G. MOYEN,
LAWRENCE G. MAECHTLEN,
HAROLD A. DUVALL,
BY

ATTORNEY.

April 5, 1932.  J. G. MOYEN ET AL  1,852,468
THERMOSTATIC SWITCH
Filed Feb. 4, 1930    2 Sheets-Sheet 2
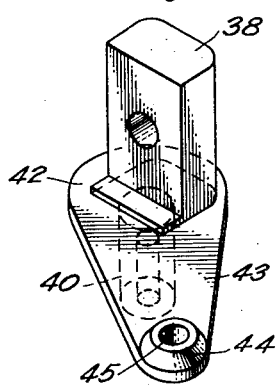
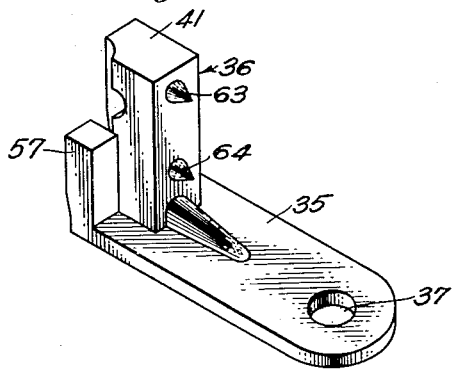
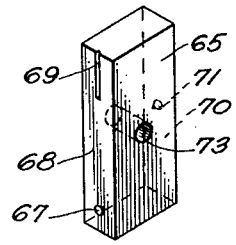
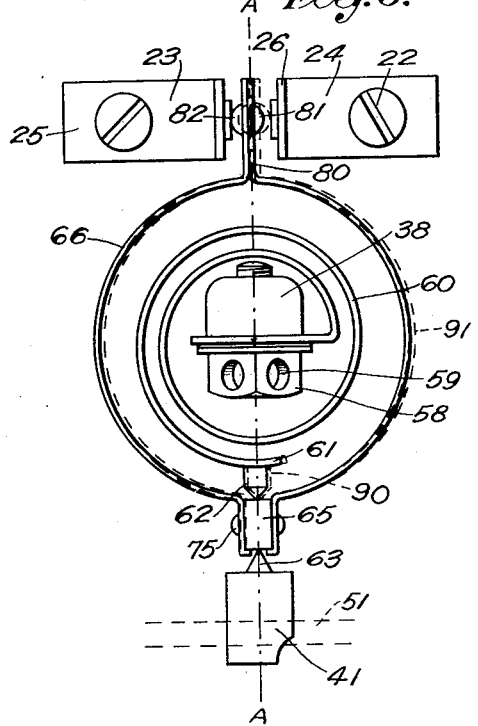
INVENTORS:
JOHN G. MOYEN,
LAWRENCE G. MAECHTLEN,
HAROLD A. DUVALL,
BY
ATTORNEY.

Patented Apr. 5, 1932

1,852,468

UNITED STATES PATENT OFFICE

JOHN G. MOYEN, LAWRENCE G. MAECHTLEN, AND HAROLD A. DUVALL, OF LOS ANGELES, CALIFORNIA, ASSIGNORS TO DIAMOND ELECTRICAL MANUFACTURING COMPANY, INC., OF LOS ANGELES, CALIFORNIA, A CORPORATION OF CALIFORNIA

THERMOSTATIC SWITCH

Application filed February 4, 1930. Serial No. 425,765.

Our invention relates to the construction of electrical control devices and relates particularly to a thermostatic switch adapted to actuate when a predetermined temperature is reached in the thermostat element forming an operative part of the switch construction. Although the invention has a great variety of uses, we shall, for the purpose of simplifying the disclosure of the invention, limit the following specification and the drawings to an embodiment especially adapted for controlling, heating, or cooling equipments employed for maintaining a desired temperature in an enclosed space such as a room or chamber of a building. At the present time rooms of residences and buildings are controlled by electrical apparatus adapted to operate the fuel valves of the heating equipment.

Our invention has the utility of controlling electrical circuits in such a manner that the heating equipment will be turned on and off in accordance with the change in temperatures within a room so as to maintain the temperature of such room within defined limits. The invention operates with such accuracy that the temperature at a desired point within a room may be maintained within one degree of a desired thermometric value. In a like manner, the invention may be employed to control cold air circulating equipment in such a manner that a desired comfortable temperature may be maintained in a room on hot days.

It is an object of the invention to provide a thermostatic switch having a set of relatively stationary contacts and a quick throw moving contact member adapted to be actuated by a thermostat element.

A further object of the invention is to provide a switch of this character with means whereby it may be manually adjusted to actuate at any temperature within prescribed limits which the operator may desire.

A further object of the invention is to provide a thermostatic switch having an adjustment provided with a graduated scale, so that such adjustment may be readily set for a desired temperature, and a coordinating means for setting or adjusting the thermostat so that it will cooperate with the manually operable adjustment means in accomplishing an accurate actuation of the contact mechanism of the complete thermostatic switch structure.

A further object of the invention is to accomplish desired mechanical operations by the use of simple, novel, and sturdy parts which will cooperate in producing a thermostatic switch characterized by accuracy, simplicity, and ruggedness.

Further objects and advantages of the invention will be made evident throughout the following part of the specification.

Referring to the drawings which are for illustrative purposes only,

Fig. 5 is an enlarged perspective elevational view of the thermostat post of the invention.

Fig. 6 is an enlarged perspective view of the pivot member of the invention.

Fig. 7 is an enlarged perspective view of the block forming part of the moving contact member of the invention.

Fig. 8 is a diagrammatic view, to enlarged scale, for showing the principal of operation of the quick throw mechanism forming part of the invention.

Figure 1:
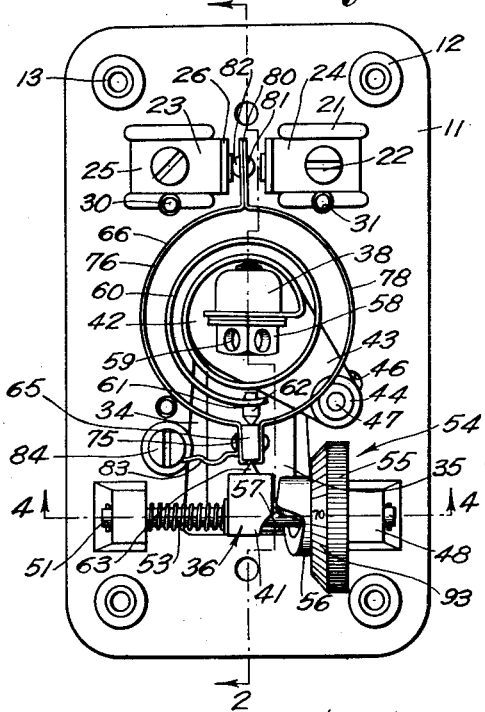
Fig. 1 is a front elevation of a preferred embodiment of our thermostatic switch.
Figure 2:
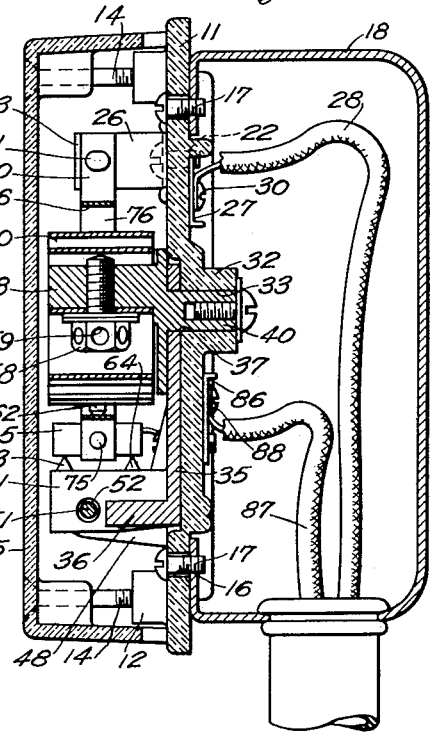
Fig. 2 is a vertical cross section taken substantially as indicated by the line 2—2 of Fig. 1.
Figure 3:
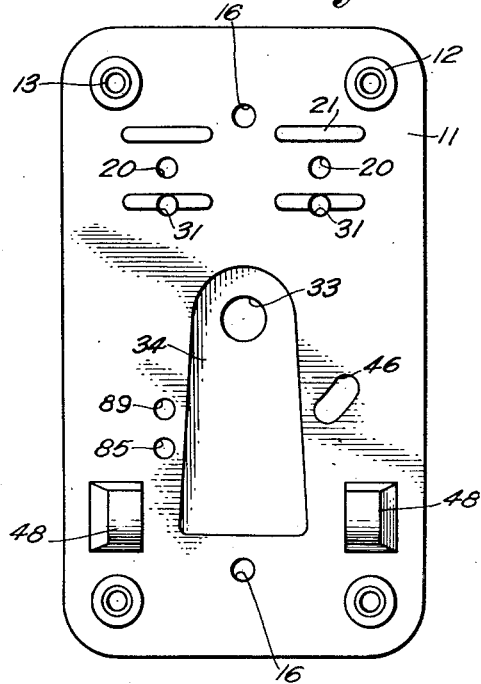
Fig. 3 is an elevation of the base plate of the switch.

In the preferred embodiment of our invention shown in the drawings, a base plate 11, as shown in Fig. 3, is employed. At the four corners of this plate 11 upwardly extending bosses 12 are formed equipped with internally threaded metal ferrules 13 adapted, as shown in Fig. 3, to receive screws 14 which are employed for holding a cup-shaped cover member 15 in place. Near the ends of the plate 11 on its vertical center line holes 16 are formed through which screws 17, as shown in Fig. 2, may be extended into engagement with an electrical outlet box 18 set in a wall at a desired point within a room. Near the upper end of the plate 11 are holes 20 situated between pairs of guide ribs or ridges 21 through which screws 22, as shown in Figs. 1 and 2, may be extended for the purpose of securing stationary or primary contact members 23 and 24 to the outer face of the plate 11. The contact members 23 and 24 have the form of angle clips and each include a base portion 25 and an outwardly extending leg 26. The base portion 25 of each contact 23 and 24 rests between a pair of cooperating ribs or ridges 21, thus being kept from rotation on the plate 11. The screws 22 extend through the base portions 25 of the contact members 23 and 24, through the holes 20 in the base 11, and screw into terminal plates or clips 27, shown in Fig. 2, to which wires, such as indicated at 28, may be attached by means of contact screws 30 which are threaded through the lower portions of the terminal clips 27 and extend outwardly through holes 31 in the plate 11. In substantially the center of the plate 11 a boss 32 projects rearwardly, as shown in Fig. 2, and through the plate and the boss a bore 33 is extended. In the outer face of the plate and extending downwardly from the bore 33 is a shallow depression or channel 34 adapted to receive the arm or plate portion 35 of a pivot member 36 which is also shown in Fig. 6. The plate portion 35 has an opening 37 at its upper end of the same diameter as the bore 33 so that when a thermostat supporting member or post 38 is placed, as shown in Fig. 2, with its rearwardly projecting cylindrical stem 40 extending through the hole 37 and the bore 33, the upper end of the plate portion 35 will be kept from vertical or lateral movement. It is a function of the pivot member 36 to swing through a limited arc within the confines of the depression 34 of the plate 11. In view of the fact that the upper end of the plate portion 35 is pivoted on the pin 40 of the thermostat post 38, the outwardly projecting head 41 of the pivot member 36 will swing through an arc concentric with the thermostat post 38.

The thermostat post 38 is provided with a radial flange 42 which rests against the outer face of the plate 11 and which is elongated at one side to form a lever arm 43. This lever arm 43 has a boss 44 formed thereon through which a threaded opening 45 is extended. The threaded opening 45 is so placed that it will coincide with a segmental slot 46 located in the base 11, as shown in Fig. 3, adjacent to the depression 34. A screw 47 is extended outwardly through the slot 46 into engagement with the threaded opening 45 so as to provide means for locking the lever portion 43 of the thermostat post 38 to the plate 11. When the screw 47 is loosened, however, the thermostat post 38 may be swung through an angle limited by the length of the slot 46.

Near the lower end of the plate 11 brackets or posts 48 project outwardly on opposite sides of the lower end of the depression 34. Through openings 50 in the outer end of the brackets 48 a horizontal shaft 51 extends, this shaft passing through a horizontal opening 52 in the head 41 of the pivot member 36. A spring 53 is mounted on the shaft 51 between the leftward bracket 50 and the head 41 so as to normally force the head 41 in rightward direction toward a manually operated adjustment means 54 consisting of a thumbwheel 55 mounted so as to rotate on the shaft 51 and having a leftwardly projecting helical cam 56 adapted to engage a cam follower 57 which projects rightwardly from the head 41 in a position below the opening 52 and the shaft 51. By rotating the thumbwheel 55 and the cam 56, the head 41 may be caused to move leftwardly or rightwardly through an arc limited by the width of the depression 34.

By means of a screw 58 having diametral holes 59 therethrough for engagement of a pin by which to accomplish rotation of the screw, a spiral bimetallic thermostat 60 is secured to the thermostat post 38. This thermostat 60 makes substantially two turns around the thermostat post 38, and its outer or active end 61 has a cone pointed member 62 projecting downwardly toward a pair of conical pivot point members 63 and 64 which project upwardly from the head 41 of the pivot member 36. As shown in Fig. 2, the pivot point members 63 and 64 are disposed on opposite sides of a vertical line extended through the active point member 62, thus providing a three-point engagement with a block 65 which forms part of a moving or secondary contact member 66.

As shown in Fig. 7, the block 65 has a conical depression 67 in its lower face 68 adapted to be engaged by the pivot point 64, and for engagement of the pivot point 63 the face 68 is provided with a V-shaped groove 69. The upper face 70 of the block 65 has a centralized conical depression 71 which is engaged by the active point 62. A hole 73 extends laterally through the block 65 so that a rivet 75 may be employed to secure to the block 65 a flat ribbon 76 which is bent to form a circular loop 78 surrounding the thermostat 60, and an outwardly extending lever portion 80 which carries right and left contacts 81 and 82. The moving contact 66 is connected into an electric circuit by means of a braided wire 83 which extends from the rivet 75 to a screw 84, which screw 84 in turn extends through a hole 85 in the base 11, as shown in Fig. 3, and makes engagement with a terminal plate 86, as shown in Fig. 2, the connection of the moving contact 66 into a circuit being completed by a wire 87 leading to a screw 88 which threads outwardly through the terminal plate 86 and projects outwardly through a hole 89 in the base plate 11. The active end 61 of the thermostat 60 moves rightwardly or leftwardly in accordance with the temperature to which the thermostat is subjected, and accordingly the active point 62 causes the block 65 to rotate on the pivot points 63 and 64, thus producing a swinging movement of the secondary contact 66.

Referring to Fig. 8, before the installing of the moving contact 66 in position, the active end 61 of the thermostat 60 rests in a position indicated by dotted lines 90. In order to place the block 65 between the points 62, 63, and 64, it is necessary to flex the active end 61 of the thermostat 60 in upward direction or into substantially the position in which it is shown in full lines in Fig. 8. The result of this is that the active point 62 is constantly pressed resiliently downwardly against the block 65, which pressure is met by the reaction of the points 63 and 64. Also, this pressure of the point 62 downwardly against the upper portion of the block 65 produces a rotation of, or force tending to rotate, the block 65 to the right or to the left whenever the point 62 and the pair of points 63 and 64 are eccentric. For instance, in Fig. 8 a center line A—A is shown extended through the pivot point 63, and the active point 62 is shown eccentric or to the left of the center line A—A, with the result that the downward pressure of the active point 62 produces a leftward rotation of the secondary contact member 66 which results in holding the contact 82 thereof against the leftward stationary or primary contact 23. This is the condition existing when the thermostat is heated slightly above the temperature at which the thermostatic switch is set to actuate. As the temperature lowers, the active end 61 of the thermostat 60 tends to swing in rightward direction, but this initial tendency of the active end 61 toward rightward movement is resisted by the leftward rotation of the block 65 due to the eccentric downward pressure of the active point 62 thereagainst. As the temperature of the thermostat continues to lower, the force exerted in rightward direction by the active end 61 thereof approaches, equals, and then exceeds the rotational moment tending to rotate the secondary contact member 66 in leftward direction. When the rightward force exerted by the active end 61 exceeds the leftward forces or moments acting on the secondary contact member 66, the very small friction due to the engagement of the points 62, 63, and 64 with the block 65 will be overcome and the secondary contact member 66 will snap over from the position in which it is shown in full lines in Fig. 8 into the position in which it is shown in dotted lines 91, thus accomplishing a quick throw movement of the secondary contact of the thermostatic switch and causing the contact 81 to strike the rightward primary contact 24 with sufficient force to insure making a perfect electrical contact.

Figure 4:
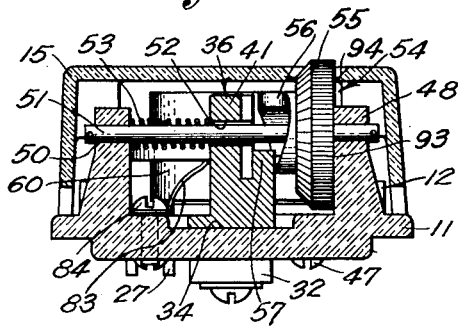
Fig. 4 is a cross section on a plane represented by the line 4—4 of Fig. 1.

A feature of the invention is to provide a manually adjustable means 54 whereby the pivot member 36 may be moved rightwardly or leftwardly so as to move the pivot points 63 and 64 from centralized position, thus changing the temperature at which the thermostatic switch will actuate. Toward this end, the thumbwheel is equipped with a graduated scale consisting of markings 93 which may be brought into alignment with a stationary arrow or mark on the cover 15 adjacent to the opening 94 therein through which the upper portion of the thumbwheel 55 projects, as shown in Fig. 4. Therefore, by rotating the thumbwheel 55 leftwardly or rightwardly, the cam 56 associated therewith may be correspondingly rotated so as to produce a leftward or rightward movement of the head 41.

As shown in Fig. 1, the stationary or primary contacts 23 and 24 are spaced apart at such distance that the movement of the secondary contact member 66 is very small, or approximately 1/64 of an inch. We find that with the contacts 23 and 24 so spaced, the thermostatic switch will actuate within very close limits. For instance, let it be supposed that the adjustment means 54 is set for actuation of the thermostatic switch at a temperature of 70° F. and the secondary contact member 66 is in the position shown in Figs. 1 and 8. As the temperature drops below 70°, the rightward force exerted by the active end 61 of the thermostat 60 will cause the secondary contact member 66 to move over into engagement with the contact 24 before the temperature of the thermostat has reached 69°. In a like manner, the increase in temperature above 70° will cause the active end 61 of the thermostat 60 to move in leftward direction and cause the secondary contact member 66 to throw over into engagement with the contact 23 before the temperature of the thermostat has reached 71°.

From the foregoing description it will be perceived that this thermostatic switch will actuate between high and low contact points within a limit of 1° on either side of a given adjustment or setting of the device. If the primary contact 24 is connected in circuit with an ON magnet adapted to open a valve of a heating device, the heating device will be turned on whenever the secondary contact member 66 moves into engagement with the primary contact 24. As the temperature in the room in which the thermostat is placed reaches and then slightly exceeds the temperature of actuation or the mean temperature for which the device is set, the secondary contact member 66 will throw over into engagement with the OFF contact 23 which is to be connected in circuit with an OFF magnet adapted to turn off the valve of the heating device.

We have explained the operation of the manual adjusting means 54 whereby the thermostatic switch may be set for a desired mean temperature. The invention also includes coordinating adjustment means for producing a relative movement between the thermostat 60 and the pivot member 36 whereby to cause coordination between the thermostat 60 and the scale 93 of the manual adjustment means 54 so that the thermostat will actuate the secondary contact 66 when the temperature of the thermostat agrees with the reading or setting of the scale 93. This coordinating adjustment means preferably consists in the limited rotation of the thermostat post 38 through an angle defined by the slot 46 in the plate 11. In the use of this coordinating adjustment means the thumbwheel 55 is rotated so as to set the scale 93 for a given temperature, such, for instance, as 70°. The screw 47 is loosened and the temperature of the thermostat 60 is then brought to 70° by placing the thermostatic switch in an atmosphere having a temperature of 70°. Then, by swinging the lever portion 43 of the thermostat post 38, the thermostat post 38 may be rotated rightwardly or leftwardly in order to cause the necessary relative movement between the active point 62 and the pivot points 63 and 64 to produce actuation of the secondary contact 66. When the desired actuation of the secondary contact 66 is accomplished, the screw 47 is tightened so as to lock the thermostat post 38 securely in its coordinate position of adjustment. After this adjustment has been made in the manner previously described, the action of the thermostat will coordinate or agree with the markings of the scale 93 of the manual adjustment means.

Although we have herein shown a simple and practical form of our invention, it is recognized that certain parts or elements thereof are representative of other parts, elements, or mechanisms which may be employed in substantially the same manner to accomplish substantially the same results; therefore, it is to be understood that the invention is not to be limited to the details disclosed herein but shall have the scope of the following claims.

We claim as our invention:

1. A thermostatic switch of the character described, including: a base; a primary contact on said base; a thermostat mounted on said base, said thermostat having an engagement part; a pivot member supported on said base so as to be movable relative to said thermostat in a direction substantially parallel to the movement of said engagement part, a secondary contact engaging said pivot member and adapted to be swung on said pivot member by said engagement part of said thermostat; and a manually operated cam member for moving said pivot member relative to said thermostat whereby to cause operative movement of said secondary contact relative to said primary contact at a desired temperature.

2. A thermostatic switch of the character described, including: a base; a primary contact on said base; a thermostat mounted on said base, said thermostat having an engagement part; a pivot member supported on said base so as to be movable relative to said thermostat in a direction substantially parallel to the movement of said engagement part; a secondary contact engaging said pivot member and adapted to be swung on said pivot member by said engagement part of said thermostat; and means for moving said pivot member relative to said thermostat whereby to cause operative movement of said secondary contact relative to said primary contact at a desired temperature.

3. A thermostatic switch of the character described, including: a base; a primary contact on said base; a thermostat mounted on said base, said thermostat having an engagement part; a pivot member supported on said base so as to be movable relative to said thermostat in a direction substantially parallel to the movement of said engagement part; a secondary contact engaging said pivot member and adapted to be swung on said pivot member by said engagement part of said thermostat; a manually operated cam member for moving said pivot member relative to said thermostat whereby to cause operative movement of said secondary contact relative to said primary contact at a desired temperature; and coordinating adjustment means for moving said thermostat relative to said pivot member.

4. A thermostatic switch of the character described, including: a base; a primary contact on said base; a thermostat mounted on said base, said thermostat having an engagement part; a pivot member supported on said base so as to be movable relative to said thermostat in a direction substantially parallel to the movement of said engagement part; a secondary contact engaging said pivot member and adapted to be swung on said pivot member by said engagement part of said thermostat; a manually operated cam member for moving said pivot member relative to said thermostat whereby to cause operative movement of said secondary contact relative to said primary contact at a desired temperature; and coordinating adjustment means for producing relative movement of said thermostat and said pivot member.

5. A thermostatic switch of the character described, including: a base; a primary contact on said base; a spiral bimetallic thermostat mounted on said base, said thermostat having an engagement part; a pivot member supported on said base so as to be movable relative to said thermostat in a direction substantially parallel to the movement of said engagement part; a secondary contact engaging said pivot member and adapted to be swung on said pivot member by said engagement part of said thermostat; and a manually operated cam member for moving said pivot member relative to said thermostat whereby to cause operative movement of said secondary contact relative to said primary contact at a desired temperature.

6. A thermostatic switch of the character described, including: a base; a primary contact on said base; a spiral bimetallic thermostat mounted on said base, said thermostat having an engagement part; a pivot member supported on said base so as to be movable relative to said thermostat in a direction substantially parallel to the movement of said engagement part; a secondary contact engaging said pivot member and adapted to be swung on said pivot member by said engagement part of said thermostat; a manually operated cam member for moving said pivot member relative to said thermostat whereby to cause operative movement of said secondary contact relative to said primary contact at a desired temperature; and coordinating adjustment means for rotating said thermostat relative to said pivot member.

7. A thermostatic switch of the character described, including: a base; a primary contact on said base; a pivot member having a projecting pivot point; a thermostat having an active point projecting therefrom in the direction of said pivot point; a secondary contact having depressions engaged by said pivot point and said active point whereby movement of said active point by said thermostat will produce a swinging movement of said secondary contact on said pivot point; and manually operated means for moving said pivot member substantially parallel to the movement of said active point, said means having a graduated scale denoting temperatures to which said thermostatic switch may be adjusted.

8. A thermostatic switch of the character described, including: a base; a primary contact on said base; a pivot member having a projecting pivot point; a thermostat having an active point projecting therefrom in the direction of said pivot point; a secondary contact having depressions engaged by said pivot point and said active point whereby movement of said active point by said thermostat will produce a swinging movement of said secondary contact on said pivot point; spring means normally forcing said pivot member in one direction; and a cam member adapted to move said pivot member in the opposite direction, said cam member having a graduated scale denoting temperatures of actuation of said thermostatic switch.

9. A thermostatic switch of the character described, including: a base; a pair of primary contact members on said base; a pivot member having a projecting pivot point; a thermostat having an active point projecting therefrom in the direction of said pivot point; and a secondary contact having depressions engaged by said pivot point and said active point whereby movement of said active point by said thermostat will produce a swinging movement of said secondary contact on said pivot point, said pivot point and said active point being spaced apart at such distance that they will exert inward pressure against said secondary contact, and said secondary contact being adapted to swing between said primary contact members with a quick throw movement due to the inward pressure exerted thereagainst by said points.

10. A thermostatic switch of the character described, including: a base; a pair of primary contact members on said base; a pivot member having a projecting pivot point; a thermostat having an active point projecting therefrom in the direction of said pivot point; a secondary contact having depressions engaged by said pivot point and said active point whereby movement of said active point by said thermostat will produce a swinging movement of said secondary contact on said pivot point, said pivot point and said active point being spaced apart at such distance that they will exert inward pressure against said secondary contact, and said secondary contact being adapted to swing between said primary contact members with a quick throw movement due to the inward pressure exerted thereagainst by said points; spring means normally forcing said pivot member in one direction; and a cam member adapted to move said pivot member in the opposite direction, said cam member having a graduated scale denoting temperatures of actuation of said thermostatic switch.

11. A thermostatic switch of the character described, including: a base; a pair of primary contact members on said base; a pivot member having a projecting pivot point; a spiral bimetallic thermostat having an active point projecting therefrom in the direction of said pivot point; a secondary contact having a circular loop portion surrounding said thermostat and having depressions engaged by said pivot point and said active point whereby movement of said active point by said thermostat will produce a swinging movement of said secondary contact on said pivot point, said pivot point and said active point being spaced apart at such distance that they will exert inward pressure against said secondary contact, and said secondary contact being adapted to swing between said primary contact members with a quick throw movement due to the inward pressure exerted thereagainst by said points; spring means normally forcing said pivot member in one direction; and a cam member adapted to move said pivot member in the opposite direction, said cam member having a graduated scale denoting temperatures of actuation of said thermostatic switch.

12. A thermostatic switch of the character described, including: a base; a pivot member on said base; a thermostat on said base having an engagement member adjacent said pivot member; a swinging member extending between said pivot member and said engagement member; means for moving said pivot member in a direction substantially parallel to the movement of said engagement member, said means having a graduated scale denoting temperatures; switch means operated in response to movement of said swinging member by said engagement member; and adjustment means for said thermostat whereby to coordinate the action of said thermostat with the graduations of said scale.

In testimony whereof, we have hereunto set our hands at Los Angeles, California, this 29th day of January, 1930.

JOHN G. MOYEN.
LAWRENCE G. MAECHTLEN.
HAROLD A. DUVALL.